United States Patent
Molander et al.

(10) Patent No.: US 11,949,662 B2
(45) Date of Patent: Apr. 2, 2024

(54) VIRTUAL ON-DEMAND INTERNET CONNECTIVITY FOR MANAGEMENT CONTROLLERS

(71) Applicant: LENOVO Enterprise Solutions (Singapore) PTE. LTD., New Tech Park (SG)

(72) Inventors: Mark Molander, Cary, NC (US); Fred Bower, III, Durham, NC (US); Chekim Chhuor, Shanghai (CN)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 3 days.

(21) Appl. No.: 17/214,632

(22) Filed: Mar. 26, 2021

(65) Prior Publication Data

US 2022/0311745 A1    Sep. 29, 2022

(51) Int. Cl.
*H04L 67/14* (2022.01)
*H04L 9/40* (2022.01)

(52) U.S. Cl.
CPC ...... *H04L 63/0281* (2013.01); *H04L 63/0236* (2013.01); *H04L 63/0272* (2013.01); *H04L 67/14* (2013.01)

(58) Field of Classification Search
CPC ............. H04L 63/0281; H04L 63/0236; H04L 63/0272; H04L 67/14
See application file for complete search history.

(56) References Cited

U.S. PATENT DOCUMENTS

| | | | |
|---|---|---|---|
| 8,370,748 B1* | 2/2013 | Maity | G06F 11/3068 715/854 |
| 11,095,730 B1* | 8/2021 | Chaganti | H04L 67/51 |
| 2011/0202685 A1* | 8/2011 | Subramaniam | G06F 15/177 709/245 |
| 2014/0173093 A1* | 6/2014 | Rabeela | H04L 61/5014 709/224 |
| 2014/0280756 A1* | 9/2014 | Maity | H04L 67/131 709/219 |
| 2014/0282045 A1* | 9/2014 | Ayanam | G06F 3/167 715/740 |
| 2014/0359615 A1* | 12/2014 | Chuang | G06F 9/45558 718/1 |

(Continued)

*Primary Examiner* — William G Trost, IV
*Assistant Examiner* — Adam A Cooney
(74) *Attorney, Agent, or Firm* — Kunzler Bean & Adamson; Bruce R. Needham

(57) ABSTRACT

A method for virtual on-demand internet connectivity for management controllers is disclosed. The method includes starting, on a management controller of a computing device connected to a management network, a management session in response to a valid login request from an authorized system administrator computer. The method includes, after startup of the management session, establishing a proxy in a browser of a device with a connection to a public network. The proxy enables the management controller to send one or more internet requests through the proxy using the connection to the public network. The method includes providing information to the system administrator computer. The provided information includes information received by the management controller in response to the one or more internet requests.

20 Claims, 8 Drawing Sheets

(56) References Cited

U.S. PATENT DOCUMENTS

| | | | |
|---|---|---|---|
| 2015/0160960 A1* | 6/2015 | Delco | G06F 9/45545 |
| | | | 718/1 |
| 2015/0178095 A1* | 6/2015 | Balakrishnan | G06F 13/364 |
| | | | 710/110 |
| 2018/0026829 A1* | 1/2018 | Bhatia | H04L 41/024 |
| | | | 709/223 |
| 2018/0077516 A1* | 3/2018 | Viswanathan | H04W 4/50 |
| 2018/0314720 A1* | 11/2018 | Gopal | G06F 16/27 |
| 2019/0026125 A1* | 1/2019 | Preimesberger | G06F 9/44505 |
| 2019/0050351 A1* | 2/2019 | Sahu | G06F 3/0604 |
| 2019/0207944 A1* | 7/2019 | Caffrey | H04L 63/101 |
| 2020/0026531 A1* | 1/2020 | Lambert | G06F 9/44542 |
| 2021/0109832 A1* | 4/2021 | Ladkani | G06F 11/076 |
| 2021/0226846 A1* | 7/2021 | Ballard | H04L 41/0843 |
| 2021/0258774 A1* | 8/2021 | Ramsay, III | H04W 12/069 |
| 2022/0103543 A1* | 3/2022 | Saha | H04L 61/2557 |

* cited by examiner

FIG. 7A

| | | | | System 2857 | | Export | USERID |

System Firmware — Update Firmware

| Type | Status | Version | Rel. Date |
|---|---|---|---|
| BMC (Primary) | Active | 2.50 | 2019-03-29 |
| BMC (Backup) | Inactive | 2.50 | 2019-03-29 |
| UEFI | Active | 1.00 | 2017-06-02 |
| LXPM | Active | 1.20 | 2018-01-29 |
| LXPM Windows Drivers | Active | 1.20 | 2018-01-29 |
| LXPM Linux Drivers | Active | 1.20 | 2018-01-29 |

Adapter Firmware — Update Firmware

| Slot No. | Device Name | Status | Version | Manufacturer | Release Date |
|---|---|---|---|---|---|

PSU Firmware — Update Firmware

| Slot No. | Version | Manufacturer |
|---|---|---|
| 1 | 1e.01 | ARTE |

Sidebar: Home, Events, Inventory, Utilization, Remote Console, Firmware Update, Server Configuration, BMC Configuration

System 2857 — Export — USERID

System Firmware — Update Firmware

| | Current Version | | | Available Version | |
|---|---|---|---|---|---|
| Type | Status | Version | Rel. Date | Version | Rel. Date |
| BMC (Primary) | Active | 2.50 | 2019-03-29 | 3.0 | 2019-11-11 |
| BMC (Backup) | Inactive | 2.50 | 2019-03-29 | - | - |
| UEFI | Active | 1.00 | 2017-06-02 | 2.41 | 2019-11-11 |
| LXPM | Active | 1.20 | 2018-01-29 | 1.70 | 2019-11-11 |
| LXPM Windows Drivers | Active | 1.20 | 2018-01-29 | 1.70 | 2019-11-11 |
| LXPM Linux Drivers | Active | 1.20 | 2018-01-29 | 1.70 | 2019-11-11 |

Adapter Firmware — Update Firmware

| Slot No. | Device Name | Status | Version | Manufacturer | Release Date |
|---|---|---|---|---|---|

PSU Firmware — Update Firmware

| Slot No. | Version | Manufacturer |
|---|---|---|
| 1 | 1e.01 | ARTE |

FIG. 7B

VIRTUAL ON-DEMAND INTERNET CONNECTIVITY FOR MANAGEMENT CONTROLLERS

FIELD

The subject matter disclosed herein relates to management controller, such as a baseboard management controller, and more particularly relates to virtual on-demand connectivity for management controllers.

BACKGROUND

A management controller, such as a baseboard management controller ("BMC") is often included in servers and other computing devices to monitor conditions of the computing devices, to power on or off the computing devices, to install firmware, and other management functions. Typically, the management controllers are connected to a management network, which is a private network that typically does not allow the management controllers to access information available on a public network, such as the Internet. Configuring the management network to access a public network is often a security issue, which requires expensive security measures to allow external access. Typically, the only access to the management controllers is to a system administrator via a system administrator computer connected via a secure connection.

With no external access to a public network for the management controllers, installation of firmware and other management functions require a lot of effort by a system administrator. For example, installation of firmware requires the system administrator to download the firmware and then upload the firmware to the management controller. Determining if firmware installed on the management controller is current often requires action by the system administrator.

BRIEF SUMMARY

A method for virtual on-demand internet connectivity for management controllers is disclosed. An apparatus and computer program product also perform the functions of the method. The method includes starting, on a management controller of a computing device connected to a management network, a management session in response to a valid login request from an authorized system administrator computer. The method includes, after startup of the management session, establishing a proxy in a browser of a device with a connection to a public network. The proxy enables the management controller to send one or more internet requests through the proxy using the connection to the public network. The method includes providing information to the system administrator computer. The provided information includes information received by the management controller in response to the one or more internet requests.

An apparatus for virtual on-demand internet connectivity for management controllers includes a management controller and a memory that stores code executable by the management controller. The code is executable to start, on the management controller of a computing device connected to a management network, a management session in response to a valid login request from an authorized system administrator computer. The code is executable to, after startup of the management session, establish a proxy in a browser of a device with a connection to a public network. The proxy enable the management controller to send one or more internet requests through the proxy using the connection to the public network. The code is executable to provide information to the system administrator computer. The provided information includes information received by the management controller in response to the one or more internet requests.

A program product for virtual on-demand internet connectivity for management controllers includes a computer readable storage medium storing program code. The program code is configured to be executable by a management controller to perform operations that include starting, on the management controller of a computing device connected to a management network, a management session in response to a valid login request from an authorized system administrator computer. The program code is configured to be executable by a management controller to perform operations that include, after startup of the management session, establishing a proxy in a browser of a device with a connection to a public network. The proxy enables the management controller to send one or more internet requests through the proxy using the connection to the public network. The program code is configured to be executable by a management controller to perform operations that include providing information to the system administrator computer. The provided information includes information received by the management controller in response to the one or more internet requests.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is a schematic block diagram of a screen of a system administrator computer depicting available information in a management session without Internet access; and FIG. 7B is a schematic block diagram of a screen of a system administrator computer depicting updated available information in a management session with Internet access.

DETAILED DESCRIPTION

Figure 1:
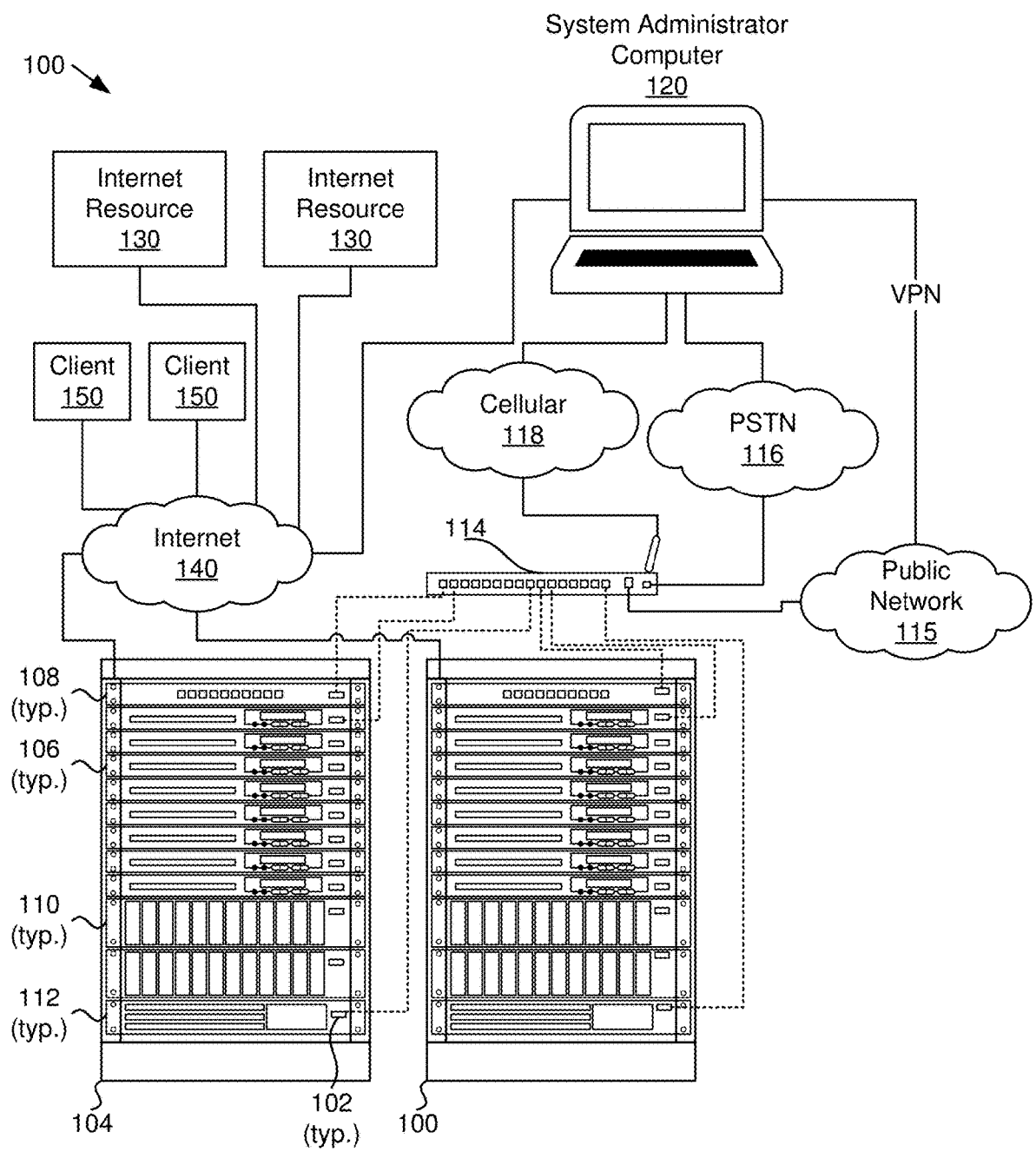
FIG. 1 is a schematic block diagram illustrating one embodiment of a system for virtual on-demand internet connectivity for management controllers.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for virtual on-demand internet connectivity for management controllers is disclosed. An apparatus and computer program product also perform the functions of the method. The method includes starting, on a management controller of a computing device connected to a management network, a management session in response to a valid login request from an authorized system administrator computer. The method includes, after startup of the management session, establishing a proxy in a browser of a device with a connection to a public network. The proxy enables the management controller to send one or more internet requests through the proxy using the connection to the public network. The method includes providing information to the system administrator computer. The provided information includes information received by the management controller in response to the one or more internet requests.

In some embodiments, the management network is a private network that restricts the management controller to inbound communication except for communication with the system administrator computer after a valid login request and subsequent establishment of the proxy in the browser. In other embodiments, the device with the connection to the public network is the system administrator computer and the system administrator computer includes access to the public network. In other embodiments, the device with the connection to the public network is a jump box and the jump box has access to the public network and the system administrator computer establishes the management session with the management controller through the jump box.

In some embodiments, the system administrator computer logs into the management controller using a secured connection. In further embodiments, the secured connection includes a virtual private network ("VPN"), a public switched telephone network ("PSTN") dial-up connection, a cellular connection, a satellite connection, WebSocket, SPDY, HTTP/2, QUIC, HTTP/3 and/or a secure shell ("SSH"). In other embodiments, the internet requests are not visible to a user of the device with the connection to the public network. In other embodiments, the management network includes a firewall configured to limit management controller initiated outbound communication. In other embodiments, the management controller sends the one or more internet requests and receives responses to the one or more internet requests using a data packet transfer protocol.

In some embodiments, the computing device with the management controller includes a server, a printer, a router, a switch, a host, a firewall, a gateway, a multiplexer ("MUX"), a power supply, a private branch exchange ("PBX"), a computing system chassis and/or a data storage device. In other embodiments, the management controller establishes the proxy in the browser in response to a command from the system administrator computer to establish the proxy. In other embodiments, the management controller establishes the proxy in the browser in response to starting the management session. In other embodiments, the management controller communicates with the system administrator computer using a protocol that includes Intelligent Platform Management Interface ("IPMI"), Redfish, Alert Standard Format ("ASF"), Hypertext Transfer Protocol ("HTTP") or Hypertext Transfer Protocol Secure ("HTTPS"). In other embodiments, the method includes terminating the proxy in response to one of a command from the system administrator computer and termination of the management session.

An apparatus for virtual on-demand internet connectivity for management controllers includes a management controller and a memory that stores code executable by the management controller. The code is executable to start, on the management controller of a computing device connected to a management network, a management session in response to a valid login request from an authorized system administrator computer. The code is executable to, after startup of the management session, establish a proxy in a browser of a device with a connection to a public network. The proxy enable the management controller to send one or more internet requests through the proxy using the connection to the public network. The code is executable to provide information to the system administrator computer. The provided information includes information received by the management controller in response to the one or more internet requests.

In some embodiments, the management network is a private network that restricts the management controller to inbound communication except for communication with the system administrator computer after a valid login request and subsequent establishment of the proxy in the browser. In other embodiments, the device with the connection to the public network is the system administrator computer and the system administrator computer includes access to the public network. In other embodiments, the device with the connection to the public network is a jump box and the jump box includes access to the public network where the system administrator computer establishes the management session with the management controller through the jump box. In other embodiments, the management controller sends the one or more internet requests and receives responses to the one or more internet requests using a data packet transfer protocol. In other embodiments, the code is further executable by the management controller to terminate the proxy in response to one of a command from the system administrator computer and termination of the management session.

A program product for virtual on-demand internet connectivity for management controllers includes a computer readable storage medium storing program code. The program code is configured to be executable by a management controller to perform operations that include starting, on the management controller of a computing device connected to a management network, a management session in response to a valid login request from an authorized system administrator computer. The program code is configured to be executable by a management controller to perform operations that include, after startup of the management session, establishing a proxy in a browser of a device with a connection to a public network. The proxy enables the management controller to send one or more internet requests through the proxy using the connection to the public network. The program code is configured to be executable by a management controller to perform operations that include providing information to the system administrator computer. The provided information includes information received by the management controller in response to the one or more internet requests.

FIG. 1 is a schematic block diagram illustrating one embodiment of a system 100 for virtual on-demand internet connectivity for management controllers 102. The system 100 includes management controllers 102 in various pieces of rack-mounted equipment, computer equipment racks 104, servers 106, a switch 108, storage devices 110, a power supply 112, a router 114, a public switched telephone network ("PSTN") 116, a cellular network 118, a system administrator computer 120, a public network 115, internet resources 130, the Internet 140 and clients 150, which are described detail below.

The system 100 includes management controllers 102 located in various computing devices which, in some embodiments, are in computer equipment racks 104. The computing devices may be devices such as a server 106, a switch 108, a storage device 110, a power supply 112, a router, a printer, a host, a firewall, a multiplexer ("MUX"), a private branch exchange ("PBX"), a computing system chassis or other computing device monitored by a management controller 102. The management controllers 102 are networked together with a management network separate from a computer network connecting the computing devices to a public network, which typically includes the Internet 140 to allow connection to various clients 150 and other devices. The management network, however, is a private network that typically does not allow the management controllers 102 to send outbound communications to a public network 115, which may include an Internet connection. Typically, the management network (represented by dashed lines) allows only inbound traffic to the management controllers 102 from trusted sources, such as the system administrator computer 120.

The management controller 102, in some embodiments, is a baseboard management controller. In other embodiments, the management controller 102 is device mounted in a computing device that provides information about the computing device. Often, the management controllers 102 are a low-level controller that provides information such as fan speed, temperature, power status, inventory information, etc. about the particular computing device in which a management controller 102 is mounted. In some embodiments, the management controllers 102 include an Ethernet port, universal serial bus ("USB") or similar connection, but may also include other interfaces, such as a video interface, a serial port, etc. or optional NIC (network interface card or network interface controller). In some embodiments, the management controller 102 is a system-on-a-chip ("SoC") and may include a processor with one or more cores and may have access to memory. Often, a management controller 102 is installed on a motherboard of a computing device, such as a server 106.

The management controller 102 communicates with the system administrator computer 120 using a management protocol, such as Intelligent Platform Management Interface ("IPMI"), Redfish, Alert Standard Format ("ASF"), Hypertext Transfer Protocol ("HTTP"), Hypertext Transfer Protocol Secure ("HTTPS"), or the like.

In some embodiments, a management controller 102 provides information and allows access to a computing device that is shut down. In other embodiments, the management controller 102 provides a way to start up the computing device where the management controller 102 is installed. In other embodiments, the management controllers 102 provide a way to update firmware in the computing devices where they are installed.

Typically, the management controllers 102 are accessed by a system administrator through the system administrator computer 120. The system administrator may initiate a management session on a management controller 102 to gain access to information about the computing device where the management controller 102 is installed or to make changes to the computing device. Often the management network does not include a way for the management controllers 102 to access the Internet or other external information for safety reasons. While some management networks may include external access for management controllers 102, such access requires stringent security protocols to prevent unauthorized access by parties trying to gain illicit access to the computing devices to steal information, to plant viruses, or other nefarious purposes. Such stringent security protocols adds unwanted cost to a management network and is typically not part of most management networks.

Often, system administrators prefer using a console of the management controller 102 for updates and other computing device administration. Typically, there is a confusing array of different tools to learn and choose from that support doing updates and other administrative tasks. In addition, there is often no bundle support to update several management controllers 102 at once and the system administrators can make mistakes that could greatly impact the computing device. To install firmware, determine if firmware is up-to-date, etc., a system administrator often must engage in a laborious process of using the system administrator computer 120 as an intermediary device requiring the system administrator to search for firmware, search for version information, etc. and then to separately transfer files to the management controller 102 of a computing device. Thus, updates are time consuming and require a lot of work from the system administrator. As a result, many computing devices with a management controller 102 are using firmware that is out-of-date.

Embodiments described herein provide a mechanism for a management controller 102 to allow initiation of a management session between a system administrator computer 120 and a management controller 102 in response to a valid login by the system administrator, establishing a proxy in a browser in the system administrator computer 120 or other device with a connection to a public network 115 and sending internet requests through the proxy connection to the public network 115, and then providing information to the system administrator computer 120 based on information received in response to the internet requests. Thus, embodiments described herein provide a way for the management controller 102 to reach out past the management network to one or more internet resources 130 or other resources available through the public network 115. The retrieved information may then be used to provide more information to a system administrator regarding administrative tasks without the system administrator having to initiate requests for information.

While the system 100 is depicted with computer equipment racks 104, in other embodiments computing devices may be standalone equipment or may include a combination of rack-mounted computing devices and standalone computing devices.

The router 114 is depicted with a connection to each management controller 102. The router 114 includes one or more external connections. In some embodiments, the system administrator computer 120 is connected to the router 114 via a public switched telephone network ("PSTN") dial-up connection 116, a cellular network 118, a satellite connection (not shown) or other connection type. In some embodiments, the system administrator computer 120 is connected to the router 114 via a public network 115 and may include a WebSocket, SPDY, HTTP/2, QUIC, HTTP/3, a secure shell ("SSH") or the like. The connection between the system administrator computer 120 and the management controller 102 over the public network 115, in some embodiments, is a virtual private network ("VPN") or similar secure connection.

The system administrator computer 120 logs into the management controller 120 using a secured connection of some type. For example, the system administrator computer 120 may use the cellular network 118 or PSTN 116 exclusively to log in to the management controller 102 and may have a network identifier and password. In other embodiments, the system administrator computer 120 uses a combination of network types and uses a secure login method, such as a VPN. Thus, the system administrator computer 120 connects to the management controllers 102 as an authorized user and/or a trusted device, which enables access through a firewall to the management controller 102.

The management network includes a firewall of some type that restricts the management controller 102 to inbound communication except for communication with the system administrator computer 120 after a valid login request and subsequent establishment of the proxy in the browser. In some embodiments, the firewall is located in each management controller 102. In other embodiments, the firewall is located in the router 114 or other device at an interface between the private management network and external connections. In some embodiments, the firewall is a separate, purpose built device that resides between the management network and external connections. In some embodiments, the public network 115 includes the internet 140. While the system 100 depicts computer equipment with management controllers 102 connected to a router 114, in other embodiments, the management controller 102 includes a NIC or other means for an external connection to the system administrator computer 120. One of skill in the art will recognize other systems with one or more computing devices with management controller 102 connected to a system administrator computer 120.

The management network and other network connected directly to the computing devices of the system 100 of FIG. 1 may include various networks, such as a local area network ("LAN"), a fiber network, a wide-area network ("WAN"), a wireless connection, or other computer network. The networks may include a combination of various network type.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 2A:
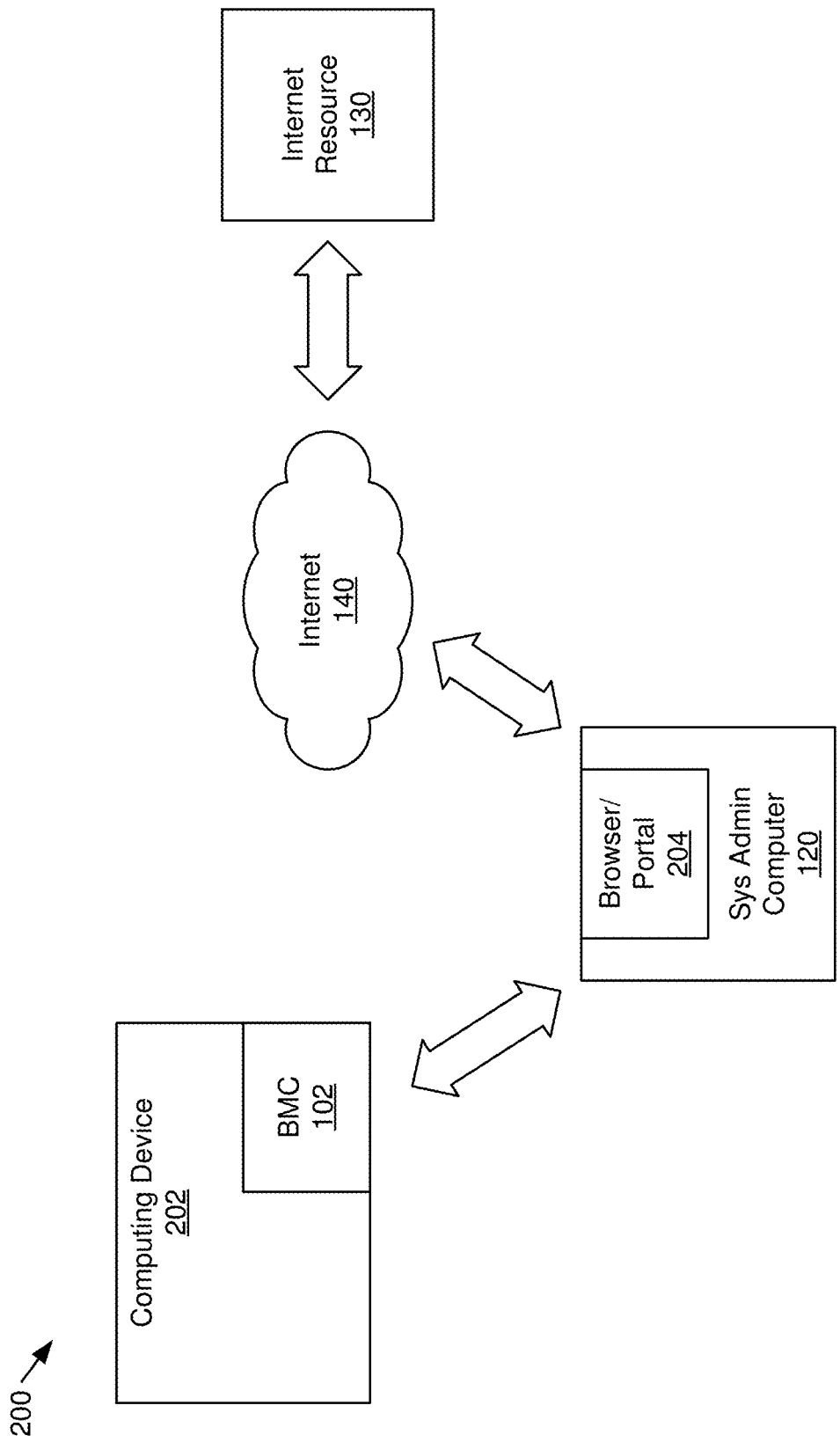
FIG. 2A is a schematic block diagram illustrating one embodiment of a simplified system for virtual on-demand internet connectivity for management controllers.

FIG. 2A is a schematic block diagram illustrating one embodiment of a simplified system 200 for virtual on-demand internet connectivity for management controllers 102. The system 200 includes a computing device 202 with a management controller 102 connected to a system administrator computer 120 with a browser 204 with a proxy 205, which is connected to an internet resource 130 via the Internet 140. In the system 200 of FIG. 2A, the system administrator computer 120 includes access to a public network 115 and the Internet 140 to access one or more internet resources 130. The system administrator computer 120 includes a browser 204 with a proxy 205 to allow the management controller 102 to send internet requests to the internet resource 130.

Figure 2B:
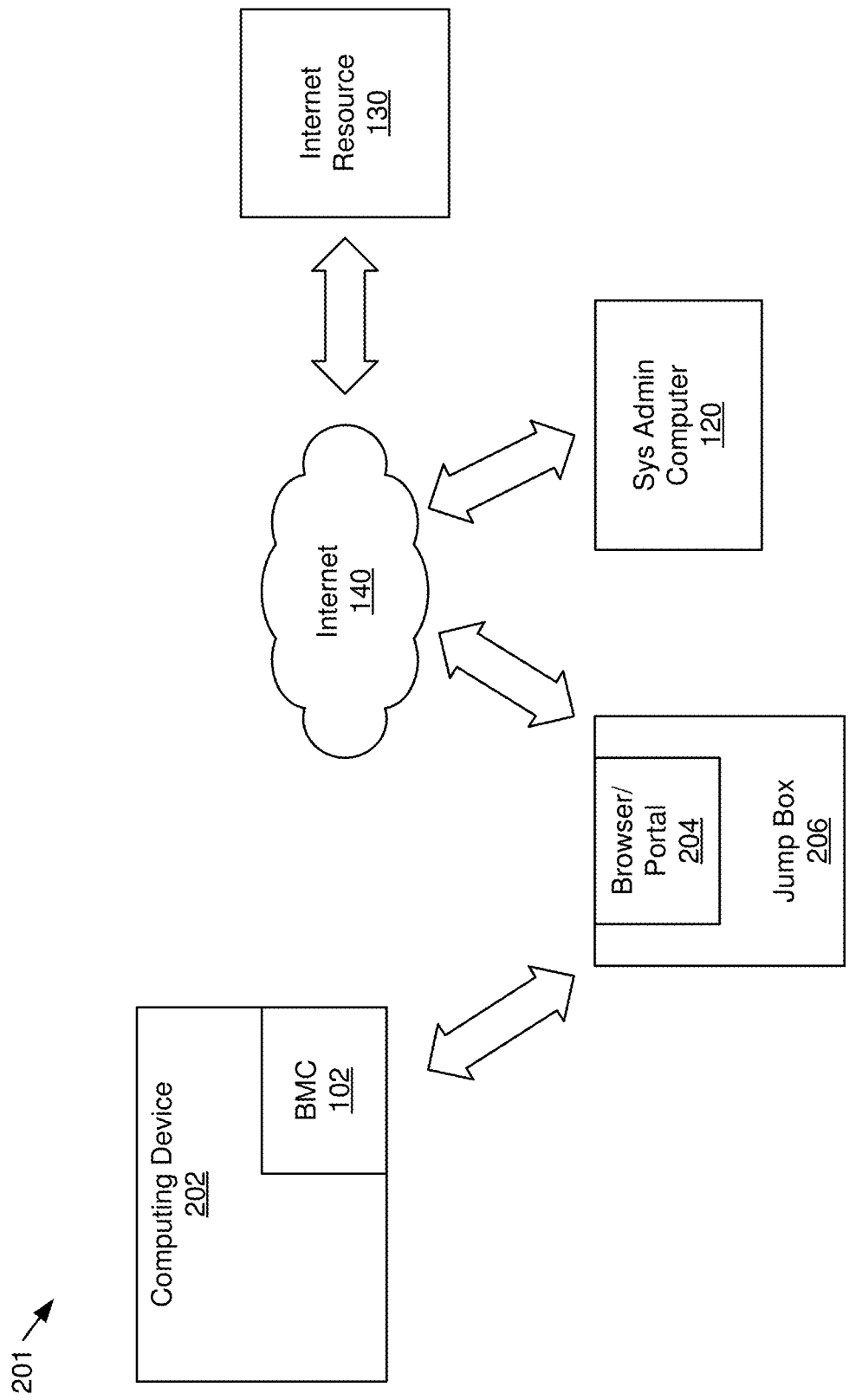
FIG. 2B is a schematic block diagram illustrating an alternate embodiment of a simplified system for virtual on-demand internet connectivity for management controllers with a jump box.

FIG. 2B is a schematic block diagram illustrating an alternate embodiment of a simplified system 201 for virtual on-demand internet connectivity for management controllers 102 with a jump box 206. In the embodiment, the jump box 206 is in communication with the management controllers 102 and the system administrator logs in through the system administrator computer 120 to the jump box 206 to gain access to the management controllers 102. The jump box 206 has external access to a public network 115 that includes internet access and has a browser 204 with a proxy 205. The system administrator computer 120 goes through the private network 115/Internet to the jump box 206 over a private connection, such as a VPN. In one embodiment, the system administrator establishes a remote desktop connection to the jump box 206 for access to the management controllers 102. A jump box 206 allows tightly controlled software and a single device in which to log in. In the embodiment of FIG. 2B, the jump box 206 includes a browser 204 with a proxy 205 established by the management controller 102.

The internet resource 130 may be a server of an equipment manufacturer or similar location with firmware updates, firmware information, or other resource with information useful to the system administrator. For example, the computing device 202 may include a graphics processing unit ("GPU") and the internet resource 130 may be a server of the manufacturer of the GPU and may include information about various versions of firmware for the GPU including which version of the firmware is most current. In other embodiments, the internet resource is a server of a company that provides the computing equipment, a company that leases the computing equipment or the like and the server may store information useful to the system administrator.

In some embodiments, the system administrator runs an application on the management controller 102 in a management session that is useful in managing the computing device 202 and/or the management controller 102. The application on the management controller 102 provides a display with management information for the computing device 202. In some embodiments, the application initiates one or more internet requests through the proxy 205 using the connection to the public network 115/Internet 140 to gather information that might not otherwise be available to the application. For example, the application may gather information available from the computing device 202, such as temperature, fan speed, operating system version, firmware versions running on the computing device 202, etc. and display the information on a display of the system administrator computer 120. The application may then use information received in response to the internet requests to populate the display with additional information about current firmware versions, etc. otherwise not available from the computing device 202.

Figure 3:
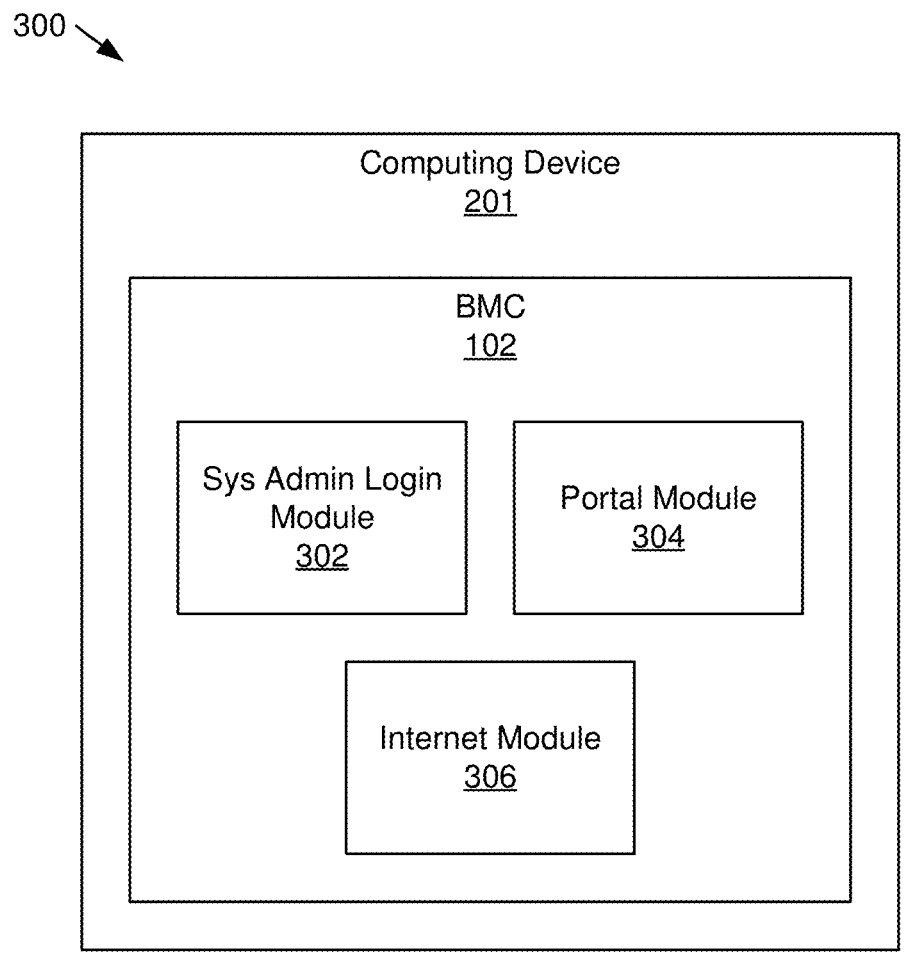
FIG. 3 is a schematic block diagram illustrating one embodiment of an apparatus for virtual on-demand internet connectivity for management controllers.

FIG. 3 is a schematic block diagram illustrating one embodiment of an apparatus 300 for virtual on-demand internet connectivity for management controllers 102. The apparatus 300 includes a computing device 202 with a management controller 102 that includes a system administrator login module 302, a proxy module 304 and an information module 306, which are described below. In some embodiments, the system administrator login module 302, the proxy module 304 and the information module 306 are implemented as program code stored on computer readable storage media, such as memory accessible to the management controller 102. In other embodiments, the system administrator login module 302, the proxy module 304 and the information module 306 are implemented by a field programmable gate array ("FPGA") where the management controller 102 is implemented via a FPGA. One of skill in the art will recognize other ways to implement the system administrator login module 302, the proxy module 304 and the information module 306.

The management controller 302 includes a system administrator login module 302 configured to start, on the management controller 102 of the computing device 202 connected to a management network, a management session in response to a valid login request from an authorized system administrator computer 120. For example, a system administrator may use the system administrator computer 120 to log into the management controller 102 to start a management session to manage the computing device 202 where the management controller 102 is located. The system administrator may go to an interface to the management controller 102 and enter a password, fingerprint, retina scan, code or other login information to securely log into the management controller 102.

In some embodiments, the system administrator establishes a VPN or similar private connection using WebSocket, SPDY, HTTP/2, QUIC, HTTP/3, SSH or the like. The connection between the system administrator computer 120 and the management controller 102 may include a PSTN dial-up connection 116, a cellular network 118, a satellite connection, a fiber connection, or the like, or any combination thereof to login and start the management session. The management controller 102, in response to the login request from the system administrator computer 120, the management controller 102 or application running on the management controller 102 recognizes the login attempt as a legitimate attempt from an authorized user and establishes a connection between the system administrator computer 120 and the management controller 102.

The management controller 102 includes a proxy module 304 that, after startup of the management session, is configured to establish a proxy 205 in a browser 204 of a device with a connection to a public network 115. The device may be the system administrator computer 120, a jump box 206 or similar device with public network 115/internet access. The proxy 205 enables the management controller 102 to send one or more internet requests through the proxy 205 using the connection to the public network 115, which may include the Internet 140. For example, an application on the management controller 102 sends an internet request to the browser 204 and the proxy transmits the internet request to a targeted internet resource 130. The internet resource 130 responds with information and the proxy 205 forwards the received information to the application on the management controller 102.

Typically, the proxy 205 forwards internet requests and responses without involvement of the system administrator. In some embodiments, the proxy 205 forwards internet requests and responses privately without any alert to the system administrator. In other embodiments, the proxy 205 forwards internet requests and responses and the proxy 205 sends a notification to the system administrator.

In some embodiments, the proxy 205 receives an internet request from the management controller 102 and reformats the internet request as appropriate to target an internet resource 130 with information requested in the internet request. Likewise, the proxy 205 may receive information from the internet resource 130 and may format the information as appropriate for the management controller 102 and/or the application running on the management controller 102.

In some embodiments, the application running on the management controller 102 sets up a browser session on the browser 204 and the proxy 205 on the browser 204. The system administrator computer 120 or jump box 206 accessing the public network 115, in some embodiments, includes browser software but does not include any code specific to the application running on the management controller 102. In other embodiments, the system administrator computer 120 or jump box 206 accessing the public network 115 includes code for setting up the proxy 205.

The management controller 102 includes an information module 306 that provides information to the system administrator computer 120 where the provided information includes information received by the management controller 102 in response to the one or more internet requests. For example, the application running on the management controller 102 receives the information received in response to the one or more internet requests, formats the information, and provides the information to the system administrator computer 120 as part of the management session.

FIG. 7A is a schematic block diagram of a screen 700 of a system administrator computer 120 depicting available information in a management session without Internet access. The "system firmware" window includes type of firmware, status information, version information and release date information, but lacks any information about available firmware versions. FIG. 7B is a schematic block diagram of a screen 702 of a system administrator computer 120 depicting updated available information in a management session with Internet access.

In some examples, after the system administrator login module 302 confirms credentials of the system administrator computer 120 and the proxy module 304 establishes a proxy 205 in a browser 204 of the system administrator computer 120 or jump box 206 and sends internet requests, the information module 306 displays received information on the screen 702 that includes the Update Firmware columns to the right of the System Firmware information where the Update Firmware columns include available version information for each firmware type and a release date for the available version. For example, for the UEFI firmware, an active firmware version on the computing device 202 is 1.0 released on Jun. 2, 2017. To the right of this information, the information module 306 displays that version 2.41 released Nov. 11, 2019 is available so that the system administrator can initiate a UEFI firmware update to version 2.41.

In existing systems, typically the system administrator is limited to transferring files to the application, such as firmware files. The proxy module 304 allows the management controller 102, or an application running on the management controller 102, to send the one or more internet requests and to receive responses to the one or more internet requests using a data packet transfer protocol. Thus, the proxy module 304 allows packets smaller than whole files to be transferred to the management controller 102.

Figure 4:
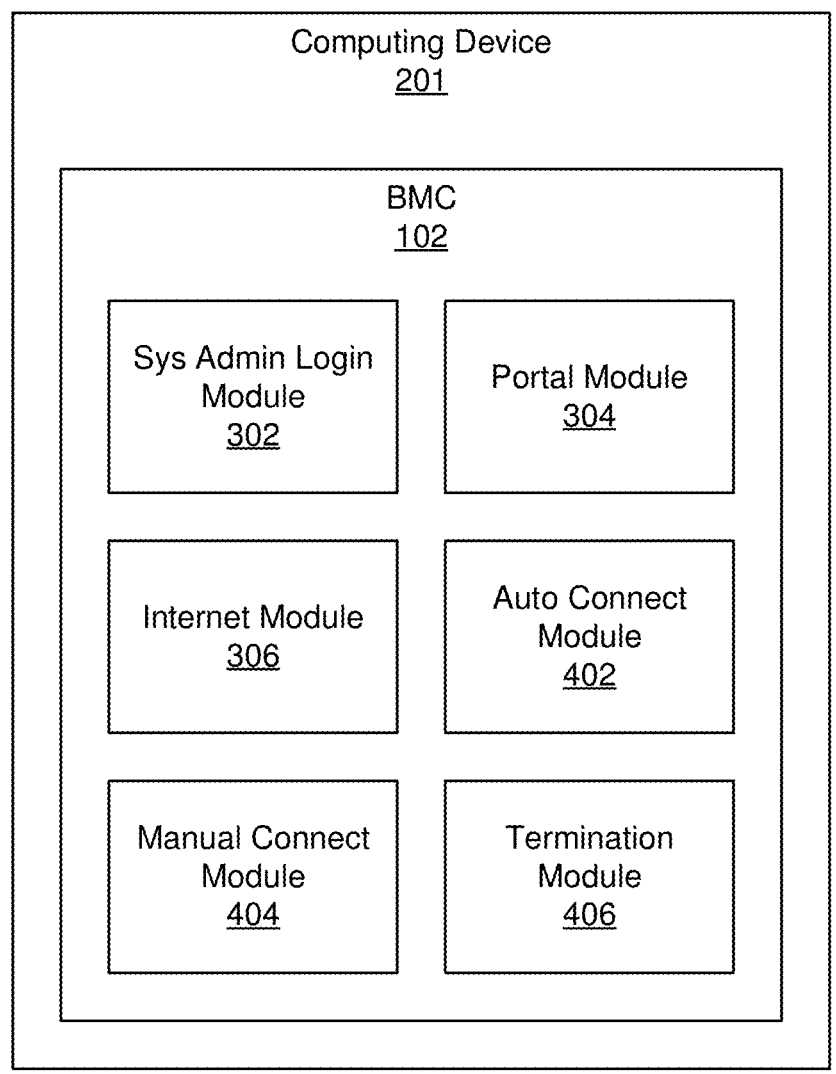
FIG. 4 is a schematic block diagram illustrating another embodiment of an apparatus for virtual on-demand internet connectivity for management controllers.

FIG. 4 is a schematic block diagram illustrating another embodiment of an apparatus 400 for virtual on-demand internet connectivity for management controllers 102. The apparatus 400 includes a computing device 202 with another embodiment of a management controller 102 that includes a system administrator login module 302, a proxy module 304 and an information module 306, which are substantially similar to those described above in relation to the apparatus 300 of FIG. 3. In various embodiments, the management controller 102 includes an auto connect module 402, a manual connect module 404 and/or a termination module 406, which are described below.

In some embodiments, the system administrator login module 302, the proxy module 304, the information module 306, the auto connect module 402, the manual connect module 404 and/or the termination module 406 are implemented as program code stored on computer readable storage media, such as memory accessible to the management controller 102. In other embodiments, the system administrator login module 302, the proxy module 304, the information module 306, the auto connect module 402, the manual connect module 404 and/or the termination module 406 are implemented by a field programmable gate array ("FPGA") where the management controller 102 is implemented via a FPGA. One of skill in the art will recognize other ways to implement the system administrator login module 302, the proxy module 304, the information module 306, the auto connect module 402, the manual connect module 404 and/or the termination module 406.

In some embodiments, the management controller 102 includes an auto connect module 402 configured to establish the proxy 205 in the browser 204 in response to a command from the system administrator computer 120 to establish the proxy 205. The auto connect module 402 establishes the proxy 205 for processing internet requests and corresponding results from the management controller 102 without user input and is based on a successful establishment of the management session between the system administrator computer 120 and the management controller 102 with an the assumption that login by the system administrator computer 120 is with a trusted user.

In other embodiments, the management controller 102 includes a manual connect module 404 configured to establish the proxy 205 in the browser 204 in response to user input from the system administrator computer 120. The manual connect module 404, in some embodiments, establishes the proxy 205 after establishment of the management session and subsequent user input, for example through interaction with the application running on the management controller 102 that establishes the proxy 205 on the browser 204.

In some embodiments, the management controller 102 includes a termination module 406 configured to terminate the proxy 205 in response to a command from the system administrator computer 120 or termination of the management session. Beneficially, the termination module 406 terminating the proxy 205 no later than ending of the management session provides security so that a channel to the management controllers 102 does not remain open after a system administrator or timeout has ended the management session. The termination module 406, in some embodiments, terminates the proxy 205 in response to a system administrator entering some type of command through the system administrator computer 120, for example, while the management session is still active.

Figure 5:
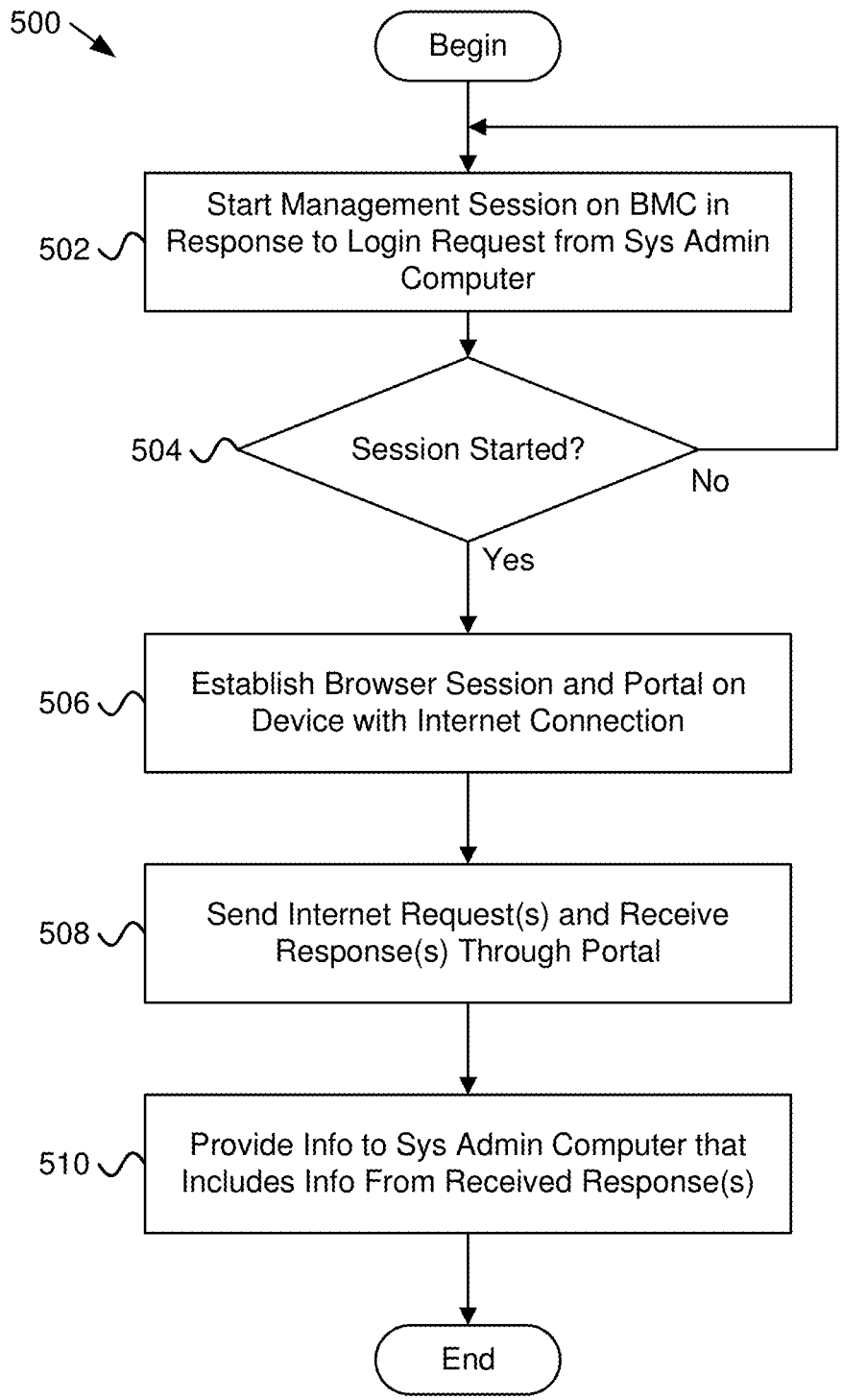
FIG. 5 is a schematic flow chart diagram illustrating one embodiment of a method for virtual on-demand internet connectivity for management controllers.

FIG. 5 is a schematic flow chart diagram illustrating one embodiment of a method 500 for virtual on-demand internet connectivity for management controllers 102. The method 500 begins and starts 502, on a management controller 102 of a computing device 202 connected to a management network, a management session in response to a valid login request from an authorized system administrator computer 120. For example, a system administrator may initiate logging into the management controller 102. In some embodiments, the system administrator computer 120 logs in directly to the management controller 102, which may take place over a cellular network 118, a PSTN dial-up connection 116, a VPN over a public network 115, a satellite connection, etc. In other embodiments, the system administrator, using the system administrator computer 120, establishes a remote desktop connection with a jump box 206 to gain access to the management controller 102.

The method 500 determines 504 if the management session is started. If the method 500 determines 504 that the management session is not started, the method 500 returns and to start 502 the management session. If the method 500 determines 504 that the management session is started, the method 500 establishes 506 a proxy 205 in a browser 204 of a device with a connection to a public network 115. The method 500 sends 508 one or more internet requests through the proxy 205 using the connection to the public network 115 and provides 510 information to the system administrator computer 120, and the method 500 ends. The provided information includes information received by the management controller 102 in response to the one or more internet requests. In various embodiments, the method 500 is implemented with the system administrator login module 302, the proxy module 304 and/or the information module 306.

Figure 6:
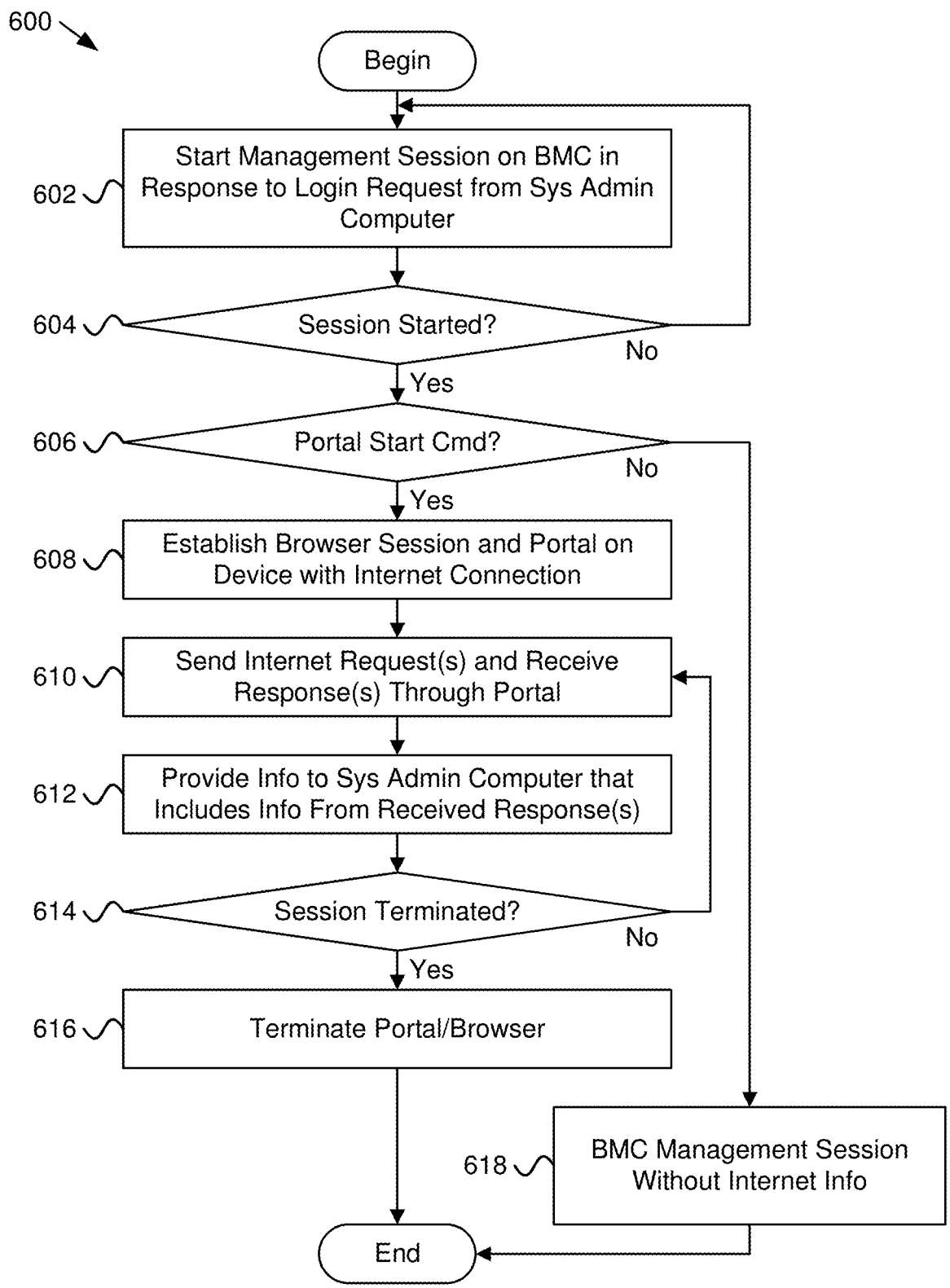
FIG. 6 is a schematic flow chart diagram illustrating another embodiment of a method for virtual on-demand internet connectivity for management controllers.

FIG. 6 is a schematic flow chart diagram illustrating another embodiment of a method 600 for virtual on-demand internet connectivity for management controllers 102. The method 600 begins and starts 602, on a management controller 102 of a computing device 202 connected to a management network, a management session in response to a valid login request from an authorized system administrator computer 120. For example, a system administrator may initiate logging into the management controller 102. In some embodiments, the system administrator computer 120 logs in directly to the management controller 102, which may take place over a cellular network 118, a PSTN dial-up connection 116, a VPN over a public network 115, a satellite connection, etc. In other embodiments, the system administrator, using the system administrator computer 120, establishes a remote desktop connection with a jump box 206 to gain access to the management controller 102.

The method 600 determines 604 if the management session is started. If the method 600 determines 604 that the management session is not started, the method 600 returns and starts 602 the management session. If the method 600 determines 604 that the management session is started, the method 600 determines 606 if a proxy start command has been issued. In some embodiments, the method 600 automatically issues the proxy start command in response to determining 604 that the management session is started. In other embodiments, the method 600 manually starts the management session after the management session is started and in response to a user command.

If the method 600 determines that a proxy start command has been issued, the method 600 establishes 608 a proxy 205 in a browser 204 of a device with a connection to a public network 115. In some embodiments, the device is the system administrator computer 120. In other embodiments, the device is a jump box 206. The method 600 sends 610 one or more internet requests and receives responses to the internet requests via the proxy 205. The proxy 205 enables, in some embodiments, the management controller 102 to send one or more internet requests through the proxy 205 using the connection to the public network 115. For example, an application may send the internet requests and may be a management application seeking information to supplement information available to the management controller 102 from the computing device 202.

The method 600 provides 612 information to the system administrator computer 120 where the provided information includes information received by the management controller 102 in response to the one or more internet requests. The method 600 determines 614 if the management session is terminated. If the method 600 determines 614 that the management session is terminated, the method 600 terminates 616 the proxy 205 on the browser 204 on the device with access to the public network 115, and the method 600 ends. If the method 600 determines 606 that a proxy start command has not been issued, the method 600 maintains 618 the management session without internet information, and the method 600 ends. For example, the management controller 102 may start the proxy 205 manually with a user command and the user may not enter the command. In various embodiments, the method 600 is implemented with the system administrator login module 302, the proxy module 304, the information module 306, the auto connect module 402, the manual connect module 404 and/or the termination module 406.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
starting, on a management controller of a computing device connected to a management network, a management session in response to a valid login request from an authorized system administrator computer;
in response to startup of the management session, establishing a proxy in a browser of a device with a connection to a public network, the proxy enabling the management controller to send one or more internet requests through the proxy using the connection to the public network and for the management controller to receive, through the proxy, responses to the internet requests from an internet resource separate from the system administrator computer, the device with the proxy separate from the computing device and from the management controller, wherein communication between the proxy and the management controller is limited to the management session;
providing information to the system administrator computer, the provided information comprising information received by the management controller in response to the one or more internet requests; and
terminating the proxy in response to termination of the management session.

2. The method of claim 1, wherein the management network is a private network that restricts the management controller to inbound communication except for communication with the system administrator computer after a valid login request and subsequent establishment of the proxy in the browser.

3. The method of claim 1, wherein the device with the connection to the public network is the system administrator computer and the system administrator computer comprises access to the public network.

4. The method of claim 1, wherein the device with the connection to the public network is a jump box and the jump box comprises access to the public network, wherein the system administrator computer establishes the management session with the management controller through the jump box.

5. The method of claim 1, wherein the system administrator computer logs into the management controller using a secured connection.

6. The method of claim 5, wherein the secured connection comprises a virtual private network ("VPN"), a public switched telephone network ("PSTN") dial-up connection, a cellular connection, a satellite connection, WebSocket, SPDY, HTTP/2, QUIC, HTTP/3 and/or a secure shell ("SSH").

7. The method of claim 1, wherein the internet requests are not visible to a user of the device with the connection to the public network.

8. The method of claim 1, wherein the management network comprises a firewall configured to limit management controller initiated outbound communication.

9. The method of claim 1, wherein the management controller sends the one or more internet requests and receives responses to the one or more internet requests using a data packet transfer protocol.

10. The method of claim 1, wherein the computing device with the management controller comprises a server, a printer, a router, a switch, a host, a firewall, a gateway, a multiplexer ("MUX"), a power supply, a private branch exchange ("PBX"), a computing system chassis and/or a data storage device.

11. The method of claim 1, wherein the management controller establishes the proxy in the browser in response to startup of the management session and in response to a command from the system administrator computer to establish the proxy.

12. The method of claim 1, wherein the management controller communicates with the system administrator computer using a protocol comprising Intelligent Platform Management Interface ("IPMI"), Redfish, Alert Standard Format ("ASF"), Hypertext Transfer Protocol ("HTTP") or Hypertext Transfer Protocol Secure ("HTTPS").

13. The method of claim 1, wherein the internet resource is not connected to the management network and the management controller receives the responses through the proxy via the management network.

14. An apparatus comprising:
a management controller; and
a memory that stores code executable by the management controller to:
start, on the management controller of a computing device connected to a management network, a management session in response to a valid login request from an authorized system administrator computer;
in response to startup of the management session, establish a proxy in a browser of a device with a connection to a public network, the proxy enabling the management controller to send one or more internet requests through the proxy using the connection to the public network and for the management controller to receive, through the proxy, responses to the internet requests from an internet resource separate from the system administrator computer, the device with the proxy separate from the computing device and from the management controller, wherein communication between the proxy and the management controller is limited to the management session;
provide information to the system administrator computer, the provided information comprising information received by the management controller in response to the one or more internet requests; and
terminating the proxy in response to termination of the management session.

15. The apparatus of claim 14, wherein the management network is a private network that restricts the management controller to inbound communication except for communication with the system administrator computer after a valid login request and subsequent establishment of the proxy in the browser.

16. The apparatus of claim 14, wherein the device with the connection to the public network is:
the system administrator computer and the system administrator computer comprises access to the public network; or
a jump box and the jump box comprises access to the public network, wherein the system administrator computer establishes the management session with the management controller through the jump box.

17. The apparatus of claim 14, wherein the management controller sends the one or more internet requests and receives responses to the one or more internet requests using a data packet transfer protocol.

18. The apparatus of claim 14, wherein the code is further executable by the management controller to terminate the proxy in response to startup of the management session and in response to a command from the system administrator computer or termination of the management session.

19. A program product comprising a computer readable storage medium storing program code, the program code being configured to be executable by a management controller to perform operations comprising:

starting, on the management controller of a computing device connected to a management network, a management session in response to a valid login request from an authorized system administrator computer;

in response to startup of the management session, establishing a proxy in a browser of a device with a connection to a public network, the proxy enabling the management controller to send one or more internet requests through the proxy using the connection to the public network and for the management controller to receive, through the proxy, responses to the internet requests from an internet resource separate from the system administrator computer, the device with the proxy separate from the computing device and from the management controller, wherein communication between the proxy and the management controller is limited to the management session;

providing information to the system administrator computer, the provided information comprising information received by the management controller in response to the one or more internet requests;

terminating the proxy in response to termination of the management session.

20. The apparatus of claim 14, wherein the internet resource is not connected to the management network and the management controller receives the responses through the proxy via the management network.

* * * * *